US008899889B2

(12) United States Patent
Yoshida

(10) Patent No.: US 8,899,889 B2

(45) Date of Patent: Dec. 2, 2014

(54) TABLE UNIT FOR MACHINE TOOL

(75) Inventor: Makoto Yoshida, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 284 days.

(21) Appl. No.: 13/446,303

(22) Filed: Apr. 13, 2012

(65) Prior Publication Data

US 2012/0266783 A1 Oct. 25, 2012

(30) Foreign Application Priority Data

Apr. 25, 2011 (JP) ................................ 2011-097421

(51) Int. Cl.

*B23C 1/14* (2006.01)
*B23Q 3/04* (2006.01)
*B23Q 1/52* (2006.01)
*B23Q 1/48* (2006.01)
*B23Q 1/62* (2006.01)

(52) U.S. Cl.

CPC .............. *B23Q 1/522* (2013.01); *B23Q 1/4857* (2013.01); *B23Q 1/621* (2013.01)

USPC ............. 409/165; 409/168; 409/198; 408/89; 269/55; 269/61; 269/71

(58) Field of Classification Search

CPC ........... B23Q 1/25; B23Q 1/54; B23Q 16/025

USPC ......... 409/146, 165, 168, 198, 202, 221, 222; 408/89, 90; 74/813 R; 269/55, 60, 71, 269/289 R, 61

See application file for complete search history.

(56) References Cited

U.S. PATENT DOCUMENTS 2,651,975 A * 9/1953 Soloff ........................... 409/184
4,369,958 A * 1/1983 Maynard ......................... 269/61
5,882,158 A 3/1999 Lechleiter et al.
6,733,217 B2 * 5/2004 Schworer et al. ............. 409/168
7,491,022 B2 * 2/2009 Kato et al. .................... 409/221
7,621,031 B2 11/2009 Kawai et al.
2003/0053875 A1 * 3/2003 Pasquetto ...................... 409/192
2006/0089089 A1 4/2006 Kato et al.
2008/0047120 A1 * 2/2008 Soroka et al. ................. 29/27 C
2009/0283950 A1 * 11/2009 Bernhard et al. ............... 269/59

FOREIGN PATENT DOCUMENTS

JP 04115841 A * 4/1992 ............... B23Q 1/04
JP 10-118867 A1 5/1998
JP 2006-110682 A1 4/2006
JP 2007-319951 A1 12/2007
JP 2010-264568 A1 11/2010

OTHER PUBLICATIONS

Japanese Office Action (Application No. 2011-097421) dated Sep. 19, 2014.

* cited by examiner

*Primary Examiner* — Erica E Cadugan
*Assistant Examiner* — Michael Vitale
(74) *Attorney, Agent, or Firm* — Burr & Brown, PLLC

(57) ABSTRACT

A table unit for a machine tool includes a tilting table provided on a base and configured to be swingably indexable around a horizontal axis, a rotary table provided on the tilting table and configured to be rotatably indexable around a vertical axis orthogonal to the horizontal axis, and at least one motor disposed in the tilting table and configured to be driven to rotate the rotary table. An axis of a motor shaft of the motor is arranged in a plane formed by the horizontal axis and the vertical axis.

2 Claims, 8 Drawing Sheets

TABLE UNIT FOR MACHINE TOOL

BACKGROUND OF INVENTION

This application claims the benefit of Japanese Patent Application Number 2011-097421 filed on Apr. 25, 2011, the entirety of which is incorporated by reference.

FIELD OF THE INVENTION

The present invention relates to a table unit for a machine tool, which comprises a tilting table swingably indexable around a horizontal axis, and a rotary table provided on the tilting table and rotatably indexable around a vertical axis orthogonal to the horizontal axis.

DESCRIPTION OF RELATED ART

A machine tool such as a vertical machining center has a bed, and a trunnion unit (AC axis unit) as a table unit provided on the bed. The trunnion unit includes a trunnion as a tilting table, which is provided on a base movable in the Y-axis direction along a Y-axis guide surface on the bed and is swingably indexable around an A-axis that is a horizontal axis parallel to an X-axis, and a rotary table provided on the trunnion and rotatably indexable around a C-axis that is a vertical axis orthogonal to the A-axis, as shown in for example, Japanese Patent Application Publication No. 2007-319951.

As a drive unit for this table unit, Japanese Patent Application Publication No. 10-118867 discloses a configuration, in which the tilting table is swingably driven by a motor and gears embedded in the base, and the rotary table is rotatably driven through a gear portion coaxially provided on the rotary table within the tilting table and a pair of toothed wheels which are meshed with the gear portion and synchronously driven to rotate by a motor through a belt and a pulley.

However, in the drive unit disclosed in Japanese Patent Application Publication No. 10-118867, the motor provided in the tilting table is offset from the horizontal axis toward the Y-axis direction as viewed from top at a position when the tilting table takes a horizontal posture. As a result, the tilting table is imbalanced and the radius of swing rotation around the horizontal axis increases, with the result that the moment of inertia of the tilting table increases and thus a large driving force is required to move the tilting table.

In view of the above, it would be desirable to provide a table unit for a machine tool, which can provide a well-balanced tilting table to reduce the radius of swing rotation around the horizontal axis and the moment of inertia, and which can be driven with a smaller driving force.

SUMMARY OF THE INVENTION

In accordance with one aspect of the present invention, as embodied and described herein, there is provided a table unit for a machine tool comprising a tilting table provided on a base and configured to be swingably indexable around a horizontal axis, a rotary table provided on the tilting table and configured to be rotatably indexable around a vertical axis orthogonal to the horizontal axis, and at least one motor disposed in the tilting table and configured to be driven to rotate the rotary table, wherein an axis of a motor shaft of the motor is arranged in a plane formed by the horizontal axis and the vertical axis.

In the above table unit, the tilting table may be swingably supported on the base at both ends of the tilting table, and the at least one motor may comprise a pair of motors symmetrically arranged with respect to the vertical axis.

In the above table unit, the tilting table may be supported in a cantilevered fashion on the base.

In the above table unit, a speed reduction mechanism may be disposed between the rotary table and the motor.

With these configurations, the table unit for a machine tool can provide a well-balanced tilting table to reduce the radius of swing rotation around the horizontal axis and the moment of inertia. Therefore, the tilting table can be driven with a smaller driving force.

Particularly, in the case in which the tilting table is supported on the base at both ends thereof and a pair of motors are symmetrically arranged with respect to the vertical axis, a large drive torque can be obtained by a pair of relatively small-sized motors and backlash of the gears can be cancelled out, so that a compact-sized and highly accurately driven table unit can be realized.

BRIEF DESCRIPTION OF THE DRAWINGS

The above aspect, other advantages and further features of the present invention will become more apparent by describing in detail illustrative, non-limiting embodiments thereof with reference to the accompanying drawings.

FIGS. 2A-2C are explanatory views of an AC axis unit, in which FIG. 2A is a top view, FIG. 2B is a front view, and FIG. 2C is a side view of a trunnion.

FIGS. 3A-3C are explanatory views of a modified AC axis unit, in which FIG. 3A is a top view, FIG. 3B is a front view, and FIG. 3C is a side view of a trunnion.

DETAILED DESCRIPTION OF THE EXEMPLARY EMBODIMENT

With reference to the accompanying drawings, one exemplary embodiment of the present invention will be described.

Figure 1:
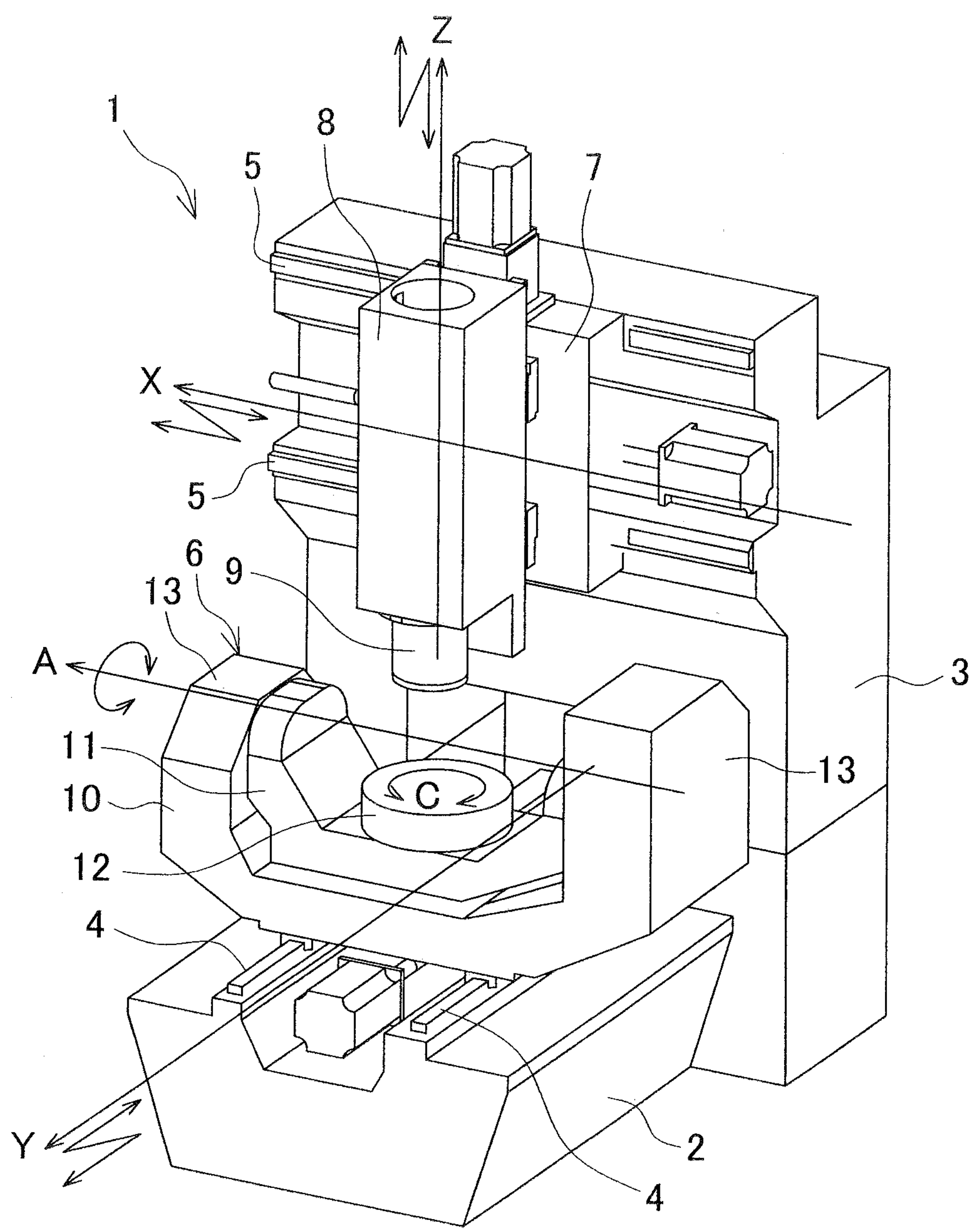
FIG. 1 is a perspective view of a vertical machining center.

FIG. 1 shows a perspective view of a five-axis vertical machining center as an example of a machine tool. The vertical machining center 1 includes a bed 2 and a cross rail 3 having a double-column structure, and Y-axis guide rails 4, 4 are provided on an upper surface of the bed 2 and X-axis guide rails 5, 5 are provided on a front surface of the cross rail 3. An AC axis unit 6 having a trunnion structure as a table unit is installed on the Y-axis guide rails 4, 4 so as to be movable in a Y-axis direction. A ram saddle 7 is installed on the X-axis guide rails 5, 5 so as to be movable in an X-axis direction. A spindle head 8 having a spindle 9 at its lower end is installed on a front surface of the ram saddle 7 so as to be movable in a Z-axis direction.

Figure 2A:
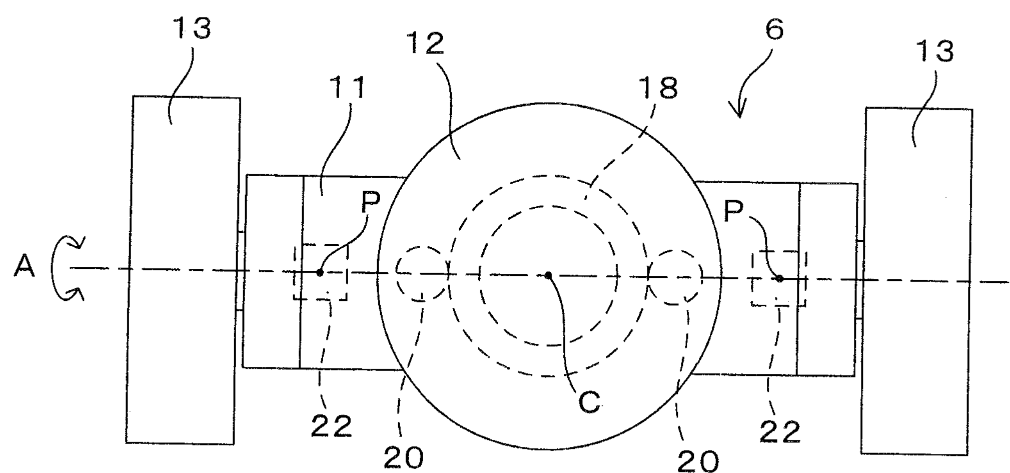
Figure 2B:
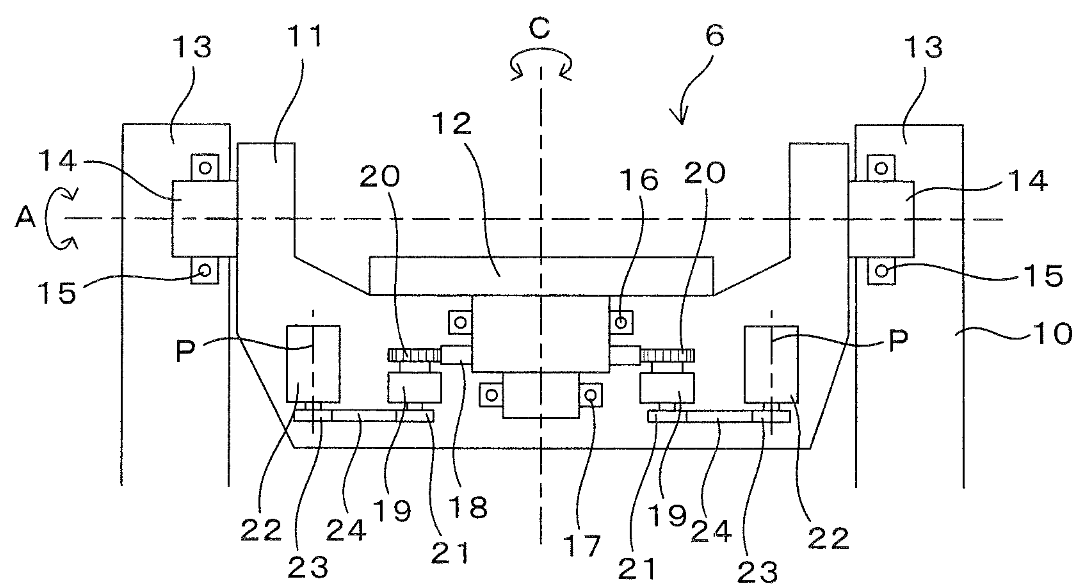
Figure 2C:
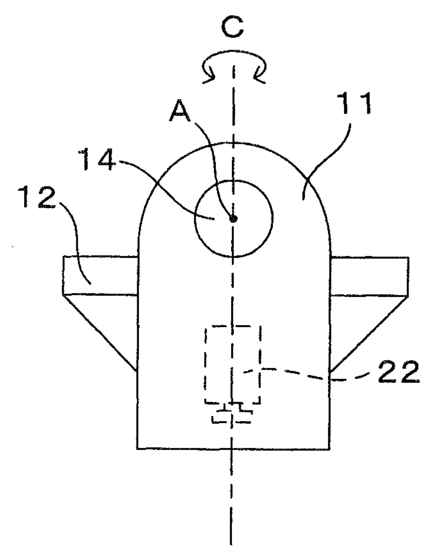

The AC axis unit 6 has a trunnion 11 as a tilting table on a base 10 which is movable on the bed 2 and has a U-shaped configuration as viewed from front. The trunnion 11 is formed into a wide U-shape, and a rotary table 12 for mounting a pallet on which a workpiece to be machined is placed is provided on the trunnion 11. As best seen in FIGS. 2B and 2C, the trunnion 11 has a pair of support shafts 14, 14 protruding right and left directions. The support shafts 14, 14 are rotatably supported by bearings 15, 15 which are provided in a pair of supporting portions 13, 13 located at both ends of the base 10. Accordingly, the trunnion 11 is swingable around an A-axis that is a horizontal axis parallel to the X-axis direction. A motor (not shown) and a speed reduction mechanism (not shown) are provided in the base 10, and when a rotary driving force is transmitted from the motor to the supporting shafts 14, 14, the trunnion 11 can be swung around the A-axis and positioned to a given indexed position.

The rotary table 12 is rotatably supported by upper and lower bearings 16, 17 in the trunnion 11. The rotary table 12 can rotate 360° around a C-axis that is a vertical axis orthogonal to the A-axis direction. A gear portion 18 is provided on the rotary table 12 between the bearings 16, 17 so as to be coaxial with and integrally rotatable with the rotary table 12.

Provided at both right and left ends of the gear portion 18 are a pair of speed reduction mechanisms 19, 19 each comprising a gear 20 provided on an upper-side output shaft and a pulley 21 provided on a lower-side input shaft, the speed reduction mechanisms 19, 19 are symmetrically arranged with respect to the C-axis with the gears 20, 20 being meshed with the gear portion 18. Each speed reduction mechanism 19 includes therein a conventionally-known planetary gear train type speed reduction unit.

Further, a pair of motors 22, 22 are arranged outside and at right and left sides of the speed reduction mechanisms 19, 19. Each of the motors 22, 22 is disposed with the motor shaft extending downward, and a pulley 23 is provided on the motor shaft. The pair of motors 22, 22 are symmetrically arranged with respect to the C-axis, and in each of the closely arranged pairs of the motors 22, 22 and the speed reduction mechanisms 19, 19, a belt 24 is looped around the pulley 23 of the motor 22 and the pulley 21 of the speed reduction mechanism 19.

The pair of motors 22, 22 are positioned such that the axis P of the motor shaft of each motor 22 is arranged in a plane formed by the C-axis and the A-axis (i.e., CA-axis plane) and parallel to the C-axis.

The rotating operations of the motors 22, 22 and the motor (not shown) for swingably and indexably driving the trunnion 11, and the movements of the AC axis unit 6, the ram saddle 7 and the spindle head 8, and etc. are controlled by an NC device (not shown).

In the vertical machining center 1 configured as described above, a workpiece fixed to the pallet on the rotary table 12 is positioned to a desired machining position by the swinging movement of the trunnion 11 around the A-axis, the rotating movement of the rotary table 12 around the C-axis, and the sliding movement of the AC axis unit 6 in the Y-axis direction. The workpiece is machined while moving the spindle 9 to which a tool is attached in the X-axis and Z-axis directions.

During machining, since the motors 22, 22 for rotating the rotary table 12 are positioned in the trunnion 11 such that the axis P of each motor 22 is arranged in the CA-axis plane, the radius of swing rotation of the trunnion 11 around the A-axis is reduced. As a result, it is possible to reduce the moment of inertia when the trunnion 11 is swingably indexed.

In the AC axis unit 6 of the vertical machining center 1 according to the above exemplary embodiment, the pair of motors 22, 22 disposed in the trunnion 11 and configured to be driven to rotate the rotary table 12 are positioned such that the axis P of the motor shaft of each motor 22 is arranged in a plane formed by the A-axis and the C-axis. With this configuration, it is possible to provide a well-balanced trunnion 11 to reduce the radius of swing rotation around the A-axis and the moment of inertia of the trunnion 11. Therefore, the trunnion 11 can be driven with a smaller driving force.

Particularly, in this embodiment, the trunnion 11 is supported on the base 10 at both ends of the trunnion 11, and the pair of motors 22, 22 are symmetrically arranged with respect to the C-axis. With this configuration, a large drive torque can be obtained by a pair of relatively small-sized motors and backlash of the gears 20, 20 can be cancelled out, so that a compact-sized and highly accurately driven AC axis unit 6 can be realized.

Although the present invention has been described in detail with reference to the above exemplary embodiment, the present invention is not limited to this specific embodiment and various changes and modifications may be made without departing from the scope of the appended claims.

In the above embodiment, the pair of speed reduction mechanism 19, 19 and the belt transmission mechanisms are disposed between the gear portion 18 of the rotary table 12 and the motors 22, 22. However, as an alternative, a toothed wheel may be provided on the motor shaft of each of the motor. The toothed wheel may be directly meshed with the gear portion of the rotary table or one or more toothed wheel members may be disposed between the toothed wheel and the gear portion of the rotary table.

Figure 3A:
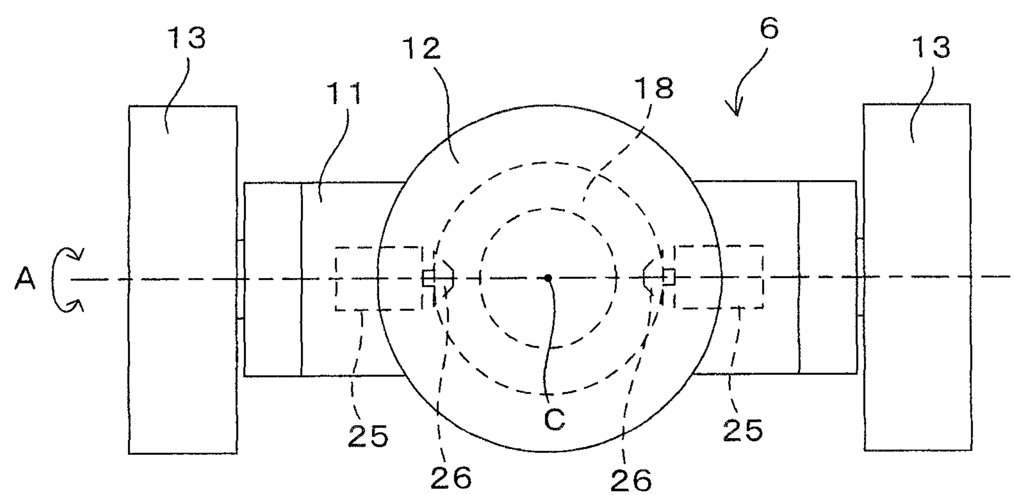
Figure 3B:
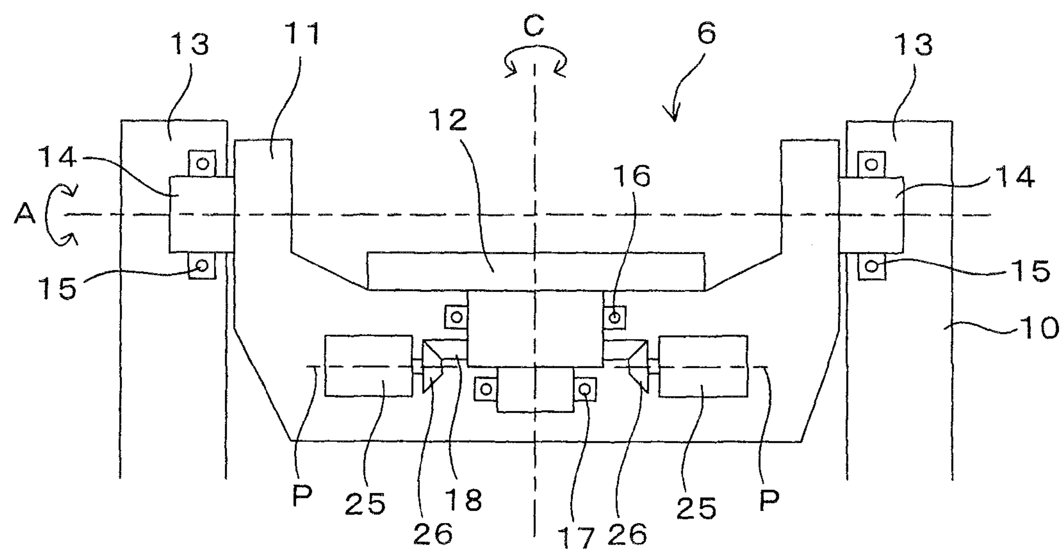
Figure 3C:
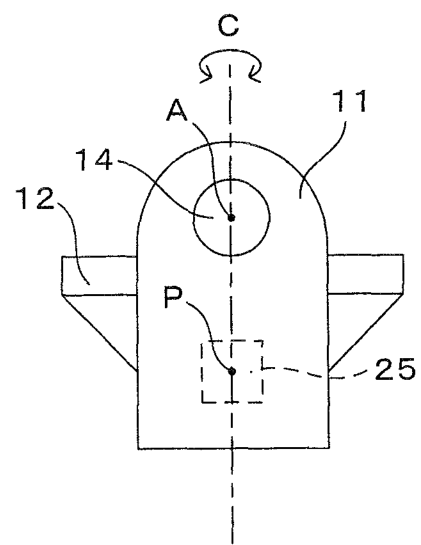

In the above embodiment, the motors 22, 22 are vertically arranged with the axes of the motor shafts being parallel to the C-axis. However, the present invention is not limited to this specific arrangement. For example, as long as the axes of the motor shafts are arranged in the plane formed by the A-axis and the C-axis, the pair of motors may be disposed laterally. To be more specific, as shown in FIG. 3, the gear portion 18 of the rotary table 12 may be formed as a bevel gear and the motor shafts of the pair of motors 25, 25 may be provided with bevel gears 26, 26 which are directly meshed with the gear portion 18, so that the motors 25, 25 are disposed laterally with the axes P, P of the motor shafts being parallel to the A-axis. Of course, in this modified embodiment, a speed reduction mechanism using one or more bevel gears may be disposed between the gear portion 18 and each of the bevel gears 26, 26. Further, the axes P, P of the motor shafts may be tilted in the plane by a predetermined angle (e.g., 45 degrees) with respect to the A-axis and the C-axis.

Further, in the above embodiment, the present invention has been applied to the AC axis unit of the vertical machining center. However, as long as a machine tool has a table unit comprising a tilting table and a rotary table, the present invention is applicable to other machine tools such as a horizontal machining center.

Figure 4:
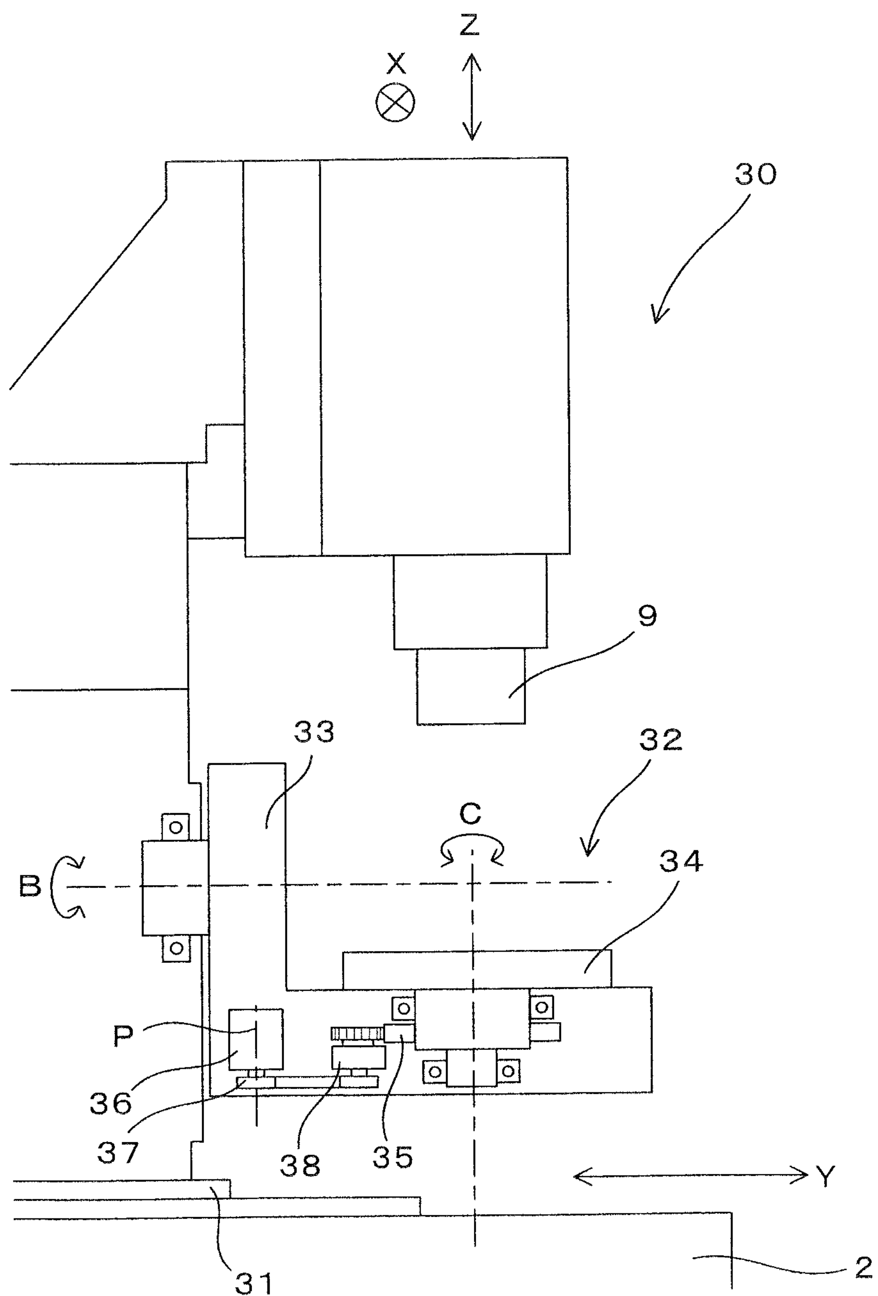
FIG. 4 is an explanatory view of a vertical machining center having a modified table unit.

Further, the present invention is applicable to a vertical machining center 30 having a table unit 32 as shown in FIG. 4. In this modified embodiment, the table unit 32 includes a forwardly protruding L-shaped tilting table 33 which is provided on a Y-axis table 31 and supported in a cantilevered fashion to be swingably indexable around a B-axis that is a horizontal axis parallel to the Y-axis, and a rotary table 34 provided on the tilting table 33 and configured to be rotatably indexable around a C-axis that is a vertical axis orthogonal to the B-axis. In this modified embodiment, one motor 36 is disposed in the tilting table 33 such that the axis P of the motor shaft thereof is arranged in a plane formed by the B-axis and the C-axis (i.e., BC-axis plane). The motor shaft of the motor 36 is provided with a gear 37, and a rotation of the gear 37 is transmitted to a gear portion 35 provided on the rotary table 34 through a speed reduction mechanism 38 and a belt transmission mechanism. Of course, instead of providing the speed reduction mechanism 38, the gear 37 may be directly meshed with the gear portion 35.

What is claimed is:

1. A table unit for a machine tool comprising:

a tilting table provided on a base and configured to be swingably indexable around a horizontal axis, wherein the tilting table is swingably supported on the base at both ends of the tilting table, one rotary table provided on the tilting table and configured to be rotatably indexable around a perpendicular axis orthogonal to the horizontal axis, a first motor and a second motor which are symmetrically arranged with respect to the perpendicular axis disposed in the tilting table and configured to be driven to rotate the rotary table, wherein an axis of a motor shaft of each motor is arranged in a plane formed by the horizontal axis and the perpendicular axis, first and second bearings provided on the rotary table, spaced along the perpendicular axis from one another, for rotationally supporting the rotary table for rotation about the perpendicular axis;

wherein a gear portion is provided on the rotary table at a location along the perpendicular axis that is between the first and second bearings; and wherein the first and second motors both operatively engage the gear portion.

2. The table unit according to claim 1, wherein a speed reduction mechanism is disposed between the rotary table and each of the motors.

* * * * *